United States Patent [19]

Hewitt

[11] 4,137,827

[45] Feb. 6, 1979

[54] DOUBLE ACTING FLUID OPERATED PISTON CYLINDER ASSEMBLY

[76] Inventor: Delbert C. Hewitt, P.O. Box 316, Wilsonville, Oreg. 97070

[21] Appl. No.: 798,163

[22] Filed: May 18, 1977

[51] Int. Cl.² ............................................. F15B 15/26
[52] U.S. Cl. ...................................... 92/24; 92/27; 92/88
[58] Field of Search ................. 92/88, 24, 27, 28, 23; 188/67

[56] References Cited

U.S. PATENT DOCUMENTS

| | | | |
|---|---|---|---|
| 2,486,615 | 11/1949 | Schreiber | 92/88 |
| 3,205,020 | 9/1965 | Schubert | 92/24 X |
| 3,221,610 | 12/1965 | King et al. | 92/88 X |
| 3,893,378 | 7/1975 | Hewitt | 92/88 |
| 3,918,351 | 11/1975 | Finke | 92/169 X |

*Primary Examiner*—Irwin C. Cohen
*Attorney, Agent, or Firm*—Eugene M. Eckelman

[57] ABSTRACT

An elongated cylinder housing has a piston therein molded from a resinous plastic material. The piston has an angularly extending slot receiving a metal clutch roller operated by a clutch control bar slidable relative to the piston. The clutch control bar is secured to a secondary piston member, and springs are disposed between the piston and the secondary piston member for normally causing the control bar to pull the clutch roller into an engaged position. The clutch roller is disposed in such engaged position to prevent travel of the piston in one direction except when actuating fluid in the cylinder operates on the secondary piston member against the force of the springs to cause the clutch roller to move the clutch control bar into a released position. The bottom of the slot that receives the clutch roller is covered by metal plates to permit free rolling engagement of the clutch roller thereon and at the same time to prevent indentation of the clutch roller into the plastic. The roller support plates are retained in the slot by interfitting projections and notches.

4 Claims, 4 Drawing Figures

U.S. Patent
Feb. 6, 1979
4,137,827
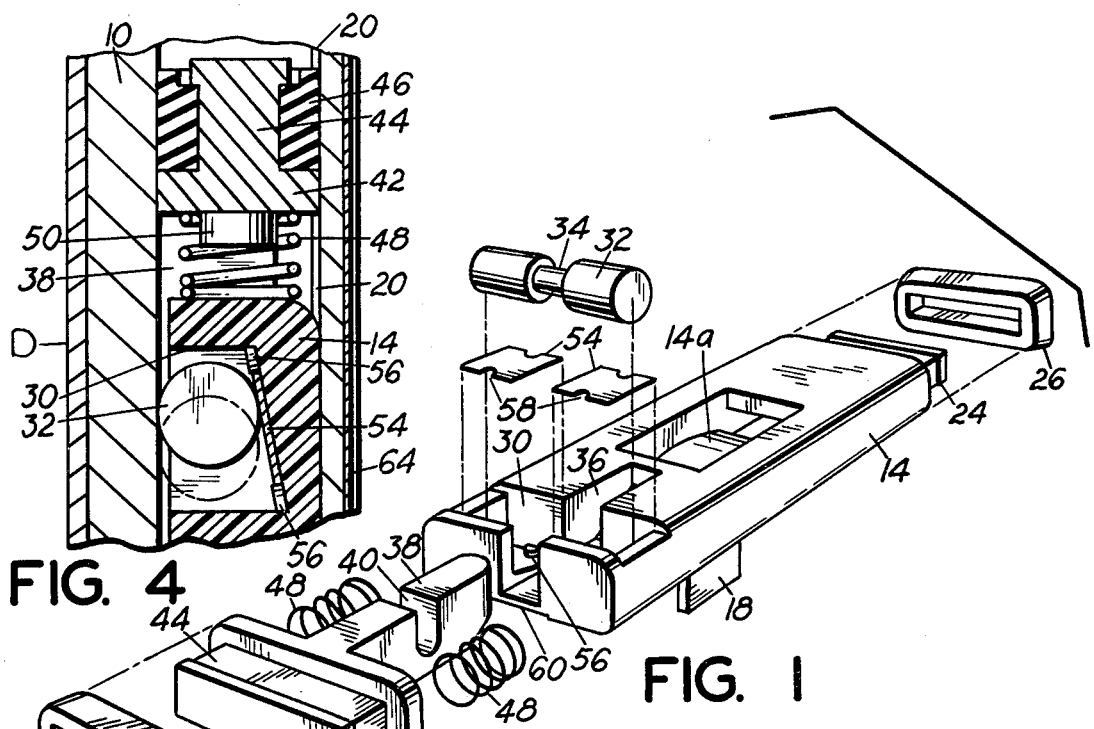
FIG. 4
FIG. 1
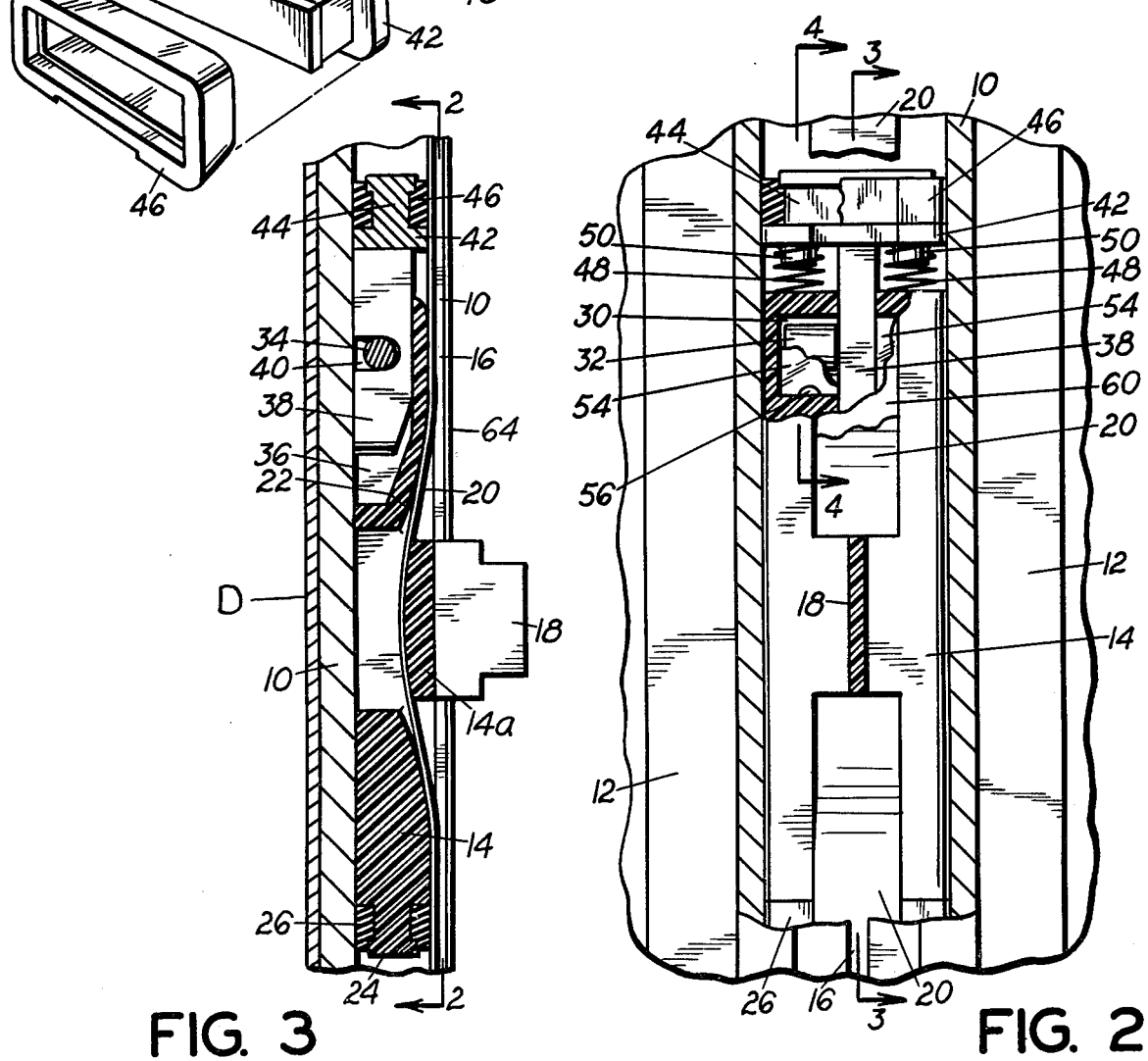
FIG. 3
FIG. 2

DOUBLE ACTING FLUID OPERATED PISTON CYLINDER ASSEMBLY

BACKGROUND OF THE INVENTION

This invention relates to new and useful improvements in double acting fluid operated piston cylinder assemblies.

My U.S. Pat. No. 3,893,378 is directed to a double acting fluid operated piston cylinder assembly employing an elongated cylinder housing having end plugs and having a piston assembly operating therein. This piston assembly is associated with a longitudinal flexible strip for sealing along one open side of the cylinder and employs a clutch control bar which operates a transverse roller in an angled slot in the main body portion.

SUMMARY OF THE INVENTION

According to the present invention and forming a primary objective thereof, a piston cylinder assembly is provided which amounts to an improvement over the structure covered by my U.S. Pat. No. 3,893,378, and more specifically, it is an object to provide a piston cylinder assembly having a specific construction such that the piston can be molded of a suitable plastic and at the same time employ a metal clutch roller without the possibility of the roller digging into the plastic and being hindered in its clutching movement. To accomplish this purpose, the plastic piston body, at angularly extending slot portions thereof which receive and cause clutching operation of clutch rollers, is provided with metal or other hardened plates between the piston body and the clutch roller, thus insuring that the clutch roller will operate every time and the clutch will have a long life. The metal plates are held in place by retaining means which have interfitting relationship with the piston.

The invention will be better understood and additional objects and advantages will become apparent from the following description taken in connection with the accompanying drawings.

BREIF DESCRIPTION OF THE DRAWINGS

FIG. 1 is an exploded view of a piston which forms a part of the invention;

FIG. 2 is a fragmentary face view, partly broken away, of a cylinder housing which receives the piston in working relation, this view being taken on the line 2—2 of FIG. 3;

FIG. 3 is a fragmentary sectional view taken on the line 3—3 of FIG. 2; and

FIG. 4 is an enlarged fragmentary sectional view taken on the line 4—4 of FIG. 2.

DETAILED DESCRIPTION OF A PREFERRED EMBODIMENT

With particular reference to the drawings, the numeral 10 designates an elongated cylinder housing which is adapted to be mounted inside a door D or the like for driving a window up and down. This housing has side flanges 12 which provide suitable connection to the door frame and furthermore this housing has top and bottom connections, not shown, by means of which pressured air is admitted to the cylinder housing in a well known manner. A piston 14 is slidable up and down in the cylinder housing 10, and the housing is provided with a narrow slot 16 extending longitudinally thereof to accommodate an arm 18 on the piston 14 which is arranged to be connected to window structure to be driven up and down.

A thin semi-flexible strip 20, preferably metal, is disposed on the inside of the cylinder housing 10 so as to cover the slot 16 interiorly of the housing. This strip extends through a channel 22 in the piston 14 and the ends thereof are secured to the top and bottom ends of the cylinder housing.

The channel 22 is provided along the entire face of the piston 14 for receiving the strip 20, this channel being of suitable dimension to provide a sliding association with the strip. Channel 22 is deepened near the mid section of the main piston to enable the strip 20 to pass beneath a cross bar 14a formed by the deepened portion of the channel. The flexible strip 20 is thus in contact with the wall of the housing along the slot 16 at all times over the entire length of the slot except at the particular location where it is diverted inwardly in the mid section of the piston so as to pass under the cross bar 14a. A sealing engagement is thus provided along the slot 16 at all places except in the area where the piston is disposed, the said area where the piston is disposed being sealed at the slot by the piston itself. Thus, the piston assembly can move in the housing with effective sealing.

The lower end of the piston 14 has a reduced dimension projection 24 which removably receives a flexible plunger-type cup 26 having slidable sealing engagement with the inner surface of the cylinder housing.

For the purpose of holding the piston against downward settling movement when it is not being operated, assuming that the housing 10 is upright as shown in FIGS. 2–4, said piston is provided with a spring actuated clutch-type brake which will now be described. The piston is formed with a transversely extending slot 30 which is best seen in FIG. 4 decreases in depth from bottom to top. A clutch brake roller 32 is carried transversely in this slot and has a center portion 34 of reduced diameter. A central, longitudinally extending slot 36 crosses the transverse slot 30 and slidably accommodates a roller control bar 38. This control bar has a transverse slot 40 which receives the reduced center portion 34 of the clutch brake roller 32. In the arrangement shown in FIG. 4 by full and phantom lines, movement of the control bar 38 controls the position of the roller 32 in the slot 30 between engaged and disengaged positions.

The control bar 38 has a transverse body portion 42 from which extends a reduced diameter projection 44 arranged to removably support a flexible plunger-like cup 46 thereon. Cup 46 has sealing engagement with the inner surface of the cylinder housing in the movements of the piston assembly. A pair of coil springs 48 have their upper ends engaged on round projections 50 on the lower face of the body portion 42 of the roller control bar, and the bottom ends of the springs bear against the top of the piston 14. These springs normally urge the roller control bar 38 away from the piston 14, and by keeping such control bar normally in such position, the clutch brake roller 32 is held in the full lines position of FIG. 4 which is its wedging position between the piston body 14 and the wall of the cylinder housing 10. In such position, the roller 32 prevents downward movement of the piston in the cylinder housing but permits upward movement of the piston. However, downward pressure on the top of the roller control bar 38 which compresses the springs 48 results in positioning the roller 32 lower down in the slot 30, namely, in the phantom line position of FIG. 4, and out of wedging or clutching engagement between the piston and the cylinder housing. This permits downward movement of the piston in the cylinder housing, and such movement can take place as long as pressure is exerted on the top of the roller control bar 38. It is thus apparent that the piston will move up and down when driven by fluid force but will be locked in position against downward movement when the fluid pressure ceases. Thus, the window can be raised either manually or by fluid pressure but the window will not move down except when there is fluid pressure on top of the piston.

The structure of the piston described facilitates molding it from a suitable plastic material so as to be rugged in operation but relatively inexpensive. The clutch brake roller 32 is preferably constructed of a metal so as to have long life particularly in its engagement of the cylinder housing which likewise is preferably constructed of metal such as from extruded aluminum. To prevent the roller from digging into the plastic at the bottom of the slot 30, the bottom of the slot is protected by a metal layer 54. The metal layer 54 comprises a pair of plate-like inserts disposed one on each side of the roller control bar 38 for engagement by clutch brake roller 32. Since the inserts 54 extend the full length of the slot 30, they cannot be displaced longitudinally. However, to prevent transverse displacement and possible interference with operation of the roller control bar 38, the bottom of the slot 30, located at least at one end thereof and preferably at both ends is provided with projections 56 and the plates 54 have notches 58 which receive the projections. Although the above locking structure for the plates 54 is a preferred one, the plates 54 could possibly have the projections as a part thereof and the notches could be provided in the walls of slot 30. Plates 54 are preferably inserted loose in the slots as inserts and thus can be readily replaced if necessary.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A double acting fluid operated piston cylinder assembly comprising
   (a) an elongated cylinder housing having defining wall portions and opposite ends arranged alternately to receive actuating fluid,
   (b) a piston assembly including a main piston body molded from a resinous plastic material,
   (c) said piston body having an open transverse slot extending thereacross,
   (d) the bottom of said slot extending angularly relative to the longitudinal center line of the cylinder housing and of said main piston body and having end portions one of which is a low side of greater depth and the other of which is high side of less depth,
   (e) a metal insert seated on said bottom of the slot,
   (f) a clutch roller in said slot having opposite ends and rotatably engageable at its opposite ends on said metal insert,
   (g) said clutch roller being of proper size to have clutching engagement between said metal insert and a wall portion of said cylinder housing when said roller moves from the low side towards the high side of said slot bottom,
   (h) said main piston body having a second slot extending in a londitudinal direction from the end of said main member nearest the high side of said first mentioned slot bottom and traversing said first mentioned slot,
   (i) a clutch control bar slidable in said second slot,
   (j) means on said control bar engaging said clutch roller so as to cause movement of said clutch roller in said first mentioned slot when said control bar is moved in said main piston body,
   (k) a secondary piston member located beyond said end of said main piston body,
   (l) said control bar being integral with said secondary piston member,
   (m) and spring means interposed between said main piston body and said secondary piston member and normally acting to cause said control bar to pull said clutch roller toward said high side of said first mentioned slot bottom, whereby said clutch roller and control bar and spring means will act to prevent travel of said piston assembly in the cylinder in one direction except when the actuating fluid in said cylinder thrusts said secondary piston closer to said main piston body against the force of said spring means, thereby automatically causing said clutch roller to be moved by said control bar into releasing position.

2. The double acting fluid operated piston cylinder assembly of claim 1 wherein said means on said control bar engaging said clutch roller comprises means defining a transverse slot receiving said clutch roller intermediate its ends, said metal insert comprising a pair of plates seated on the bottom of said open transverse slot in said piston body on opposite sides of said clutch control bar.

3. The double acting fluid operated piston cylinder assembly of claim 1 wherein said means on said control bar engaging said clutch roller comprises means defining a transverse slot receiving said clutch roller intermediate its ends, said metal insert comprising a pair of plates seated on the bottom of said open transverse slot in said piston body on opposite sides of said clutch control bar, and retaining means in the slot in said main piston body engageable with said support plates preventing transverse displacement of said plates.

4. A double acting fluid operated piston cylinder assembly comprising
   (a) an elongated cylinder housing having opposite ends arranged alternately to receive actuating fluid,
   (b) a piston assembly including a main piston body molded from a resinous material,
   (c) said piston body having an open transverse slot extending thereacross,
   (d) the bottom of said slot extending angularly relative to the longitudinal center line of the cylinder housing and of said main piston body and having end portions one of which is a low side of greater depth and the other of which is a high side of less depth,
   (e) a metal support seated on said bottom of the slot,
   (f) a clutch roller in said slot having opposite ends and rotatably engageable at its opposite ends on said metal support,
   (g) said clutch roller being of proper size to have clutching engagement with the cylinder wall when said roller moves from the low side towards the high side of said slot bottom, (h) said main piston body having a second slot extending in a longitudinal direction from the end of said main member nearest the high side of said first mentioned slot bottom and traversing said first mentioned slot,
(i) a clutch control bar slidable in said second slot,
(j) means in said control bar defining a transverse slot receiving said clutch roller intermediate ends,
(k) said metal support comprising a pair of plates seated on the bottom of said open transverse slot in said piston body on opposite sides of said clutch control bar,
(l) interfitting projections and notches on said plates and respective portions of said open transverse slot in said piston body preventing transverse displacement of said plates,
(m) a secondary piston member located beyond said end of said main piston body,
(n) said control bar being secured to said secondary piston member,
(o) and spring means interposed between said main piston body and said secondary piston member and normally acting to cause said control bar to pull said clutch roller toward said high side of said first mentioned slot bottom, whereby said clutch roller and control bar and spring means will act to prevent travel of said piston assembly in the cylinder in one direction except when the actuating fluid in said cylinder thrusts said second piston closer to said main piston body against the force of said spring means, thereby automatically causing said clutch roller to be moved by said control bar into releasing position.

* * * * *